Sept. 21, 1926. 1,600,710
F. BOOS
IMPLEMENT FOR MAKING CHECKS OR FURROWS
Filed May 19, 1925 2 Sheets-Sheet 2
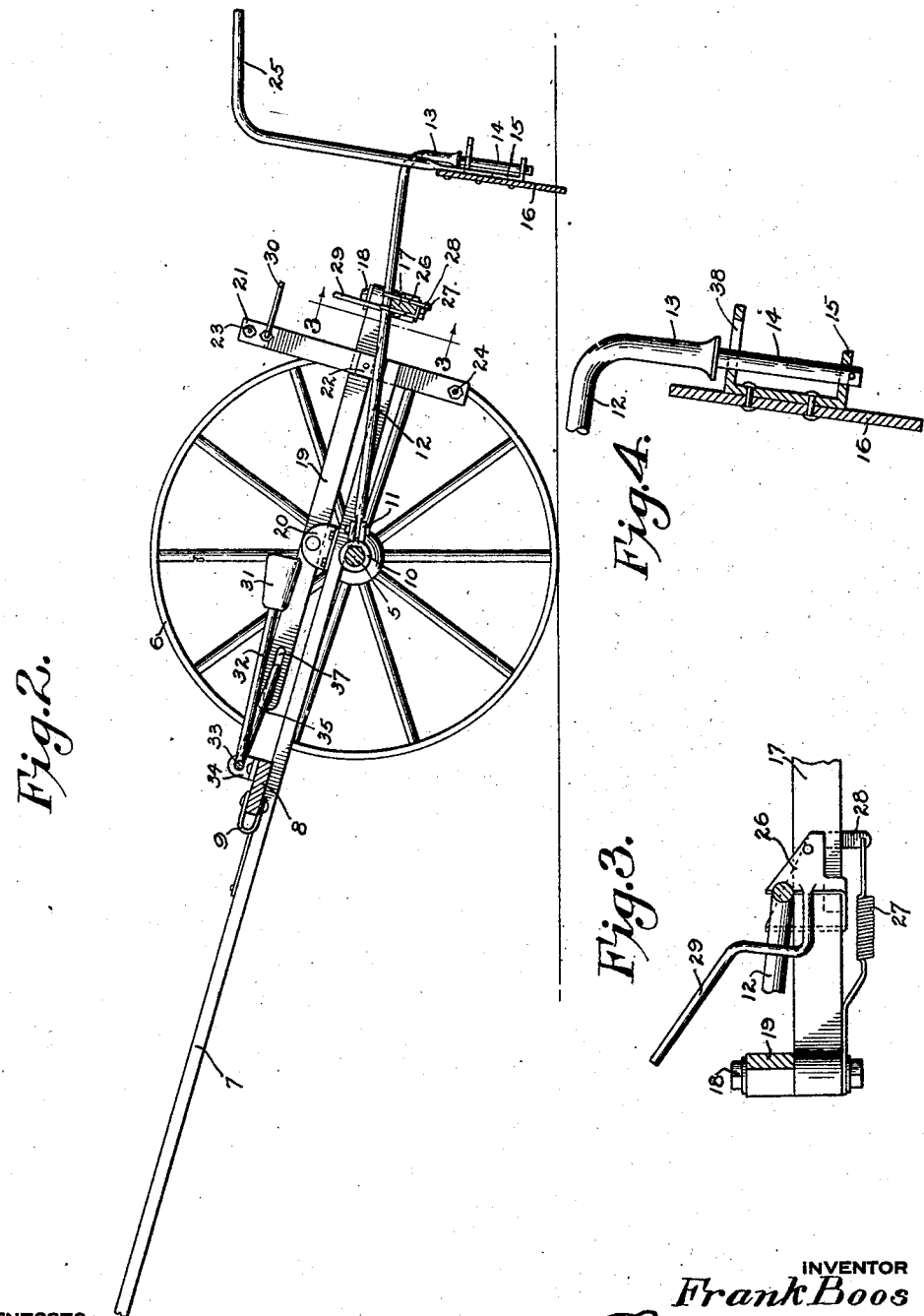
INVENTOR
*Frank Boos*
WITNESSES
BY
ATTORNEY Patented Sept. 21, 1926.

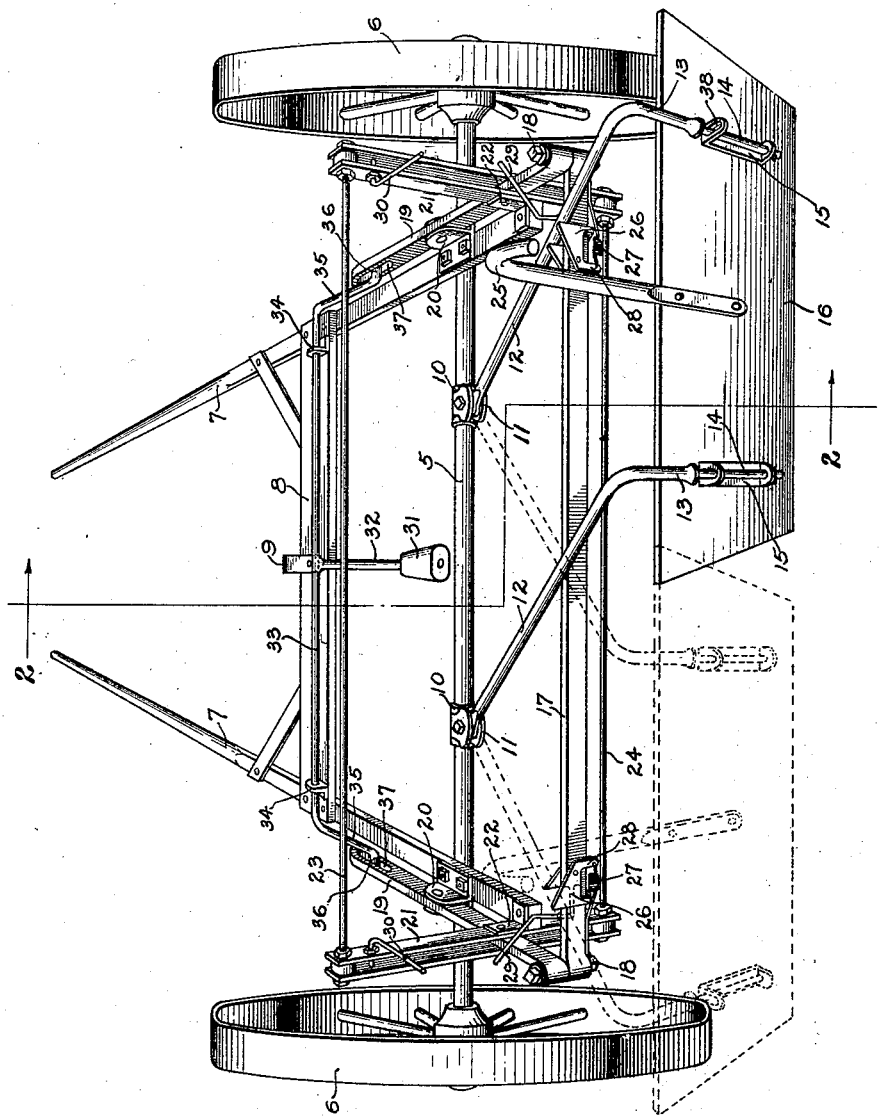

1,600,710

UNITED STATES PATENT OFFICE.

FRANK BOOS, OF SANGER, CALIFORNIA.

IMPLEMENT FOR MAKING CHECKS OR FURROWS.

Application filed May 19, 1925. Serial No. 31,375.

This invention relates to a farm implement for making checks or furrows, such as are necessary for the proper irrigation of tracts of cultivated land. In the cultivation of vineyards and orchards in arid regions, for example, it has been customary to run several checks or furrows between two adjacent rows, and these are alternately connected at their ends by cross furrows, so that when the water is turned in, it flows the entire length of one furrow, back in the next furrow and so on, seeping into the ground during its flow until the entire tract is thoroughly watered. The running of these checks or furrows by hand, which is the method heretofore usually employed, necessitates a great amount of labor and expense, and not more than two acres can be furrowed in a day.

The general purpose of the present invention is to provide an implement of simple construction, preferably mounted on wheels which may be drawn by one or two draft animals, and which may be easily controlled by the driver to form the furrows in the desired manner as fast as the team can walk, so that many acres can be furrowed in a single day. The invention also includes various adjustable features and other specific improvements to facilitate the work, the construction and advantages of which will be fully explained in the following detailed description, which is to be read in connection with the accompanying drawings illustrating one embodiment of the invention.

In the drawings:

Figure 1 is a perspective view of the invention looking from the rear.

Figure 2 is a vertical longitudinal section thereof, taken on the line 2—2 of Figure 1.

Figure 3 is a detail sectional view taken on the line 3—3 of Figure 2.

Figure 4 is a detail sectional view of the means for supporting the scraper or shovel.

The invention in the embodiment shown in the drawings is mounted on an axle 5, which is supported by wheels 6, and has means connected therewith for drawing the implement over the ground. This means, as illustrated, comprises shafts 7, which are connected by a cross bar 8 having a clevis 9 mounted centrally thereof for attaching a whippletree.

A pair of sleeves 10 are secured to the axle 5, and journaled thereon are a pair of connecting members formed with rearwardly projecting ears 11, between which are pivoted the forward ends of draw bars 12. The rear ends of the bars 12 are bent downwardly, as at 13, and terminate in spindles 14 adapted to support brackets 15, which are secured to the rear face of the shovel or scraper blade 16. The bars 12, intermediate their ends, normally rest upon a transverse rail 17, each end of which is supported by a bolt 18, or the like. from the rear end of a lever 19. Each of these levers is intermediately pivoted to a bracket 20, which is secured to the adjacent shaft 7 where it crosses the axle 5. The rear portions of the levers 19 are guided between vertical guide plates 21, which are intermediately secured by brackets 22 to the rear ends of the shafts 7, and are braced at their upper and lower ends by truss rods 23 and 24, respectively.

A handle 25 is secured to and extends upwardly from the shovel 16 for manipulating the latter as the implement is drawn forwardly between the rows. A latch 26 is pivotally mounted near each end of the rail 17, and is normally projected upwardly by means of a coiled spring 27 connected to a finger 28, which projects downwardly from the latch. In this position, one rod or the other is latched near the side of the implement frame, while the implement is drawn from one end of the row to the other. In returning, the shovel may be shifted to the other side of the frame. In order that the latch 26 may be easily actuated to release the bar 12, a finger 29 is formed thereon which is bent upwardly and outwardly, and when the shovel 16 is lifted out of the furrow, this finger 29 is adapted to engage a stop finger 30 secured to the guide plates 21 near the upper end thereof, thereby rocking the latch downwardly about its pivot until the bar 12 is released.

In order that the shovel 16 may be easily manipulated, it is preferred to provide means for partially or wholly counterbalancing its weight. In the construction herein shown, this counterbalance is in the form of a weight 31, secured at or near the end of an arm 30, which extends rearwardly from a rock shaft 33 mounted in brackets 34 secured to the cross bar 8. The end portions of the rock shaft are bent rearwardly, as at 35, and terminate in outturned ends 36, which project into slots 37 formed in the front end portions of the levers 19. The weight 31, therefore, has a tendency to rock the levers 19 to lift the rail 17 and the bars 12, at the rear ends of which the shovel is carried.

The upper portion of each of the brackets 15 is preferably formed with an elongated slot 38, so as to permit a limited rocking movement of the shovel 16. When the furrow is being formed, the handle 25 is moved rearwardly and downwardly to the depth desired, the bars 12 resting on the rail 17. At the end of the furrow the shovel is lifted, this operation being aided by the counterbalance 31, and the shovel is also brought forwardly in order to clear the dirt therefrom. If it is desired then to shift the shovel to the other side of the frame, it is lifted high enough so that the finger 29 is engaged by the stop finger 30 to release the latch 26 from the supporting bar 12.

From the foregoing description, it will be seen that the invention may be used for running furrows as fast as the team can move forwardly. The shovel 16 can be manipulated, as desired, without the slightest pause.

While the invention is particularly designed for forming checks or furrows for irrigating purposes, it is apparent that many features of the invention may be used for other purposes. It is also apparent that many modifications may be made in the details of construction without sacrificing any material feature of the invention. It is my purpose, therefore, to include all such modifications within the scope of the claims.

What is claimed is:

1. In an implement of the class described, the combination of a frame, a pair of arms mounted to swing laterally and vertically with respect to said frame, a transversely disposed shovel carried by the free ends of said arms, an outwardly facing abutment at each side of the frame against which the corresponding arm engages to retain the blade approximately at the limit of its lateral movement.

2. In an implement of the class described, the combination of a frame, a transversely disposed shovel blade mounted to swing laterally of said frame by a parallel motion, means including a latch for retaining the blade at either side of the frame, and means engageable with the latch to release the blade when the latter is raised a predetermined distance to permit said blade to be swung to the other side of the frame.

3. In an implement of the class described, the combination of a frame, a transversely disposed shovel blade mounted to swing laterally and also vertically with respect to said frame, latching means for retaining the blade at either side of the frame, and a counterbalance tending to swing the blade upwardly.

4. In an implement of the class described, the combination of a frame, a transversely disposed shovel blade mounted to swing laterally or vertically by a parallel motion, latching means for retaining the blade at either side of the frame, means engageable with the latching means to release the blade when the latter is raised a predetermined distance to permit said blade to be swung to the other side of the frame, and a counterbalance tending to swing the blade upwardly.

5. In an implement of the class described, the combination of a frame, a pair of parallel arms pivoted at their forward ends to swing laterally, a transversely disposed shovel blade supported at the rear ends of the arms so as to have a limited rocking movement forwardly and backwardly thereon, and means for latching said arms to retain the blade at either side of the frame.

6. In an implement of the class described, the combination of a frame, a pair of parallel arms pivoted at their forward ends to swing laterally, a transversely disposed rail on which the intermediate portions of said arms normally rest, a shovel blade supported at the rear ends of the arms, and latches pivoted to said rail and engageable with the respective arms to retain the shovel blade at either side of the frame.

7. In an implement of the class described, the combination of a frame, a pair of parallel arms supported at their forward ends to swing laterally and also vertically, a transversely disposed rail on which the intermediate portions of said arms are supported, a pair of levers supporting said rails, a shovel blade supported at the rear ends of said arms, and means acting on said levers to press the rail upwardly and tending to lift the shovel blade out of the ground.

8. In an implement of the class described, the combination of a frame, a pair of parallel arms pivoted at their forward ends to swing laterally, a transversely disposed rail on which the intermediate portions of said arms normally rest, a shovel blade supported at the rear ends of the arms, latches pivoted to said rail and engageable with the respective arms to retain the shovel at either side of the frame, and means engageable with the latches to release the blade when the latter is raised a predetermined distance to permit said blade to be swung to the other side of the frame.

9. In an implement of the class described, the combination of a frame, a pair of parallel arms supported at their forward ends to swing laterally and also vertically, a transversely disposed rail on which the intermediate portions of said arms are supported, a pair of levers supporting said rail, a shovel blade supported at the rear ends of said arms, means acting on said levers to press the rail upwardly against the arms and tending to lift the shovel blade out of the ground, means engageable with the respective arms to latch the same so as to retain the shovel blade at either side of the frame, and means engageable with the latches to release the blade when the latter is raised a predetermined distance to permit said blade to be swung to the other side of the frame.

10. In an implement of the class described, the combination of a frame, a pair of parallel arms supported at their forward ends to swing laterally and also vertically, a transversely disposed rail on which the intermediate portions of said arms are supported, a pair of levers intermediately fulcrumed and supporting said rail, each of said levers having a slot near one end, a rock shaft having arms projecting into said slots and also having an arm with a weight attached thereto, said weight acting as a counterbalance for the rail and shovel blade, and latching means engageable with said parallel arms to retain the shovel blade at either side of the frame.

11. In an implement of the class described, the combination of a frame, a pair of parallel arms supported at their forward ends to swing laterally and also vertically, a transversely disposed rail on which the intermediate portions of said arms are supported, a pair of levers intermediately fulcrumed and supporting said rail, each of said levers having a slot near one end, a rock shaft having arms projecting into said slots and also having an arm with a weight attached thereto, said weight acting as a counterbalance for the rail and shovel blade, latching means engageable with said parallel arms to retain the shovel blade at either side of the frame, and means engageable with the latches to release the blade when the latter is raised a predetermined distance to permit said blade to be swung to the other side of the frame.

In testimony, that I claim the foregoing as my own, I have hereto affixed my signature.

FRANK BOOS.